(12) United States Patent
Huang et al.

(10) Patent No.: US 8,819,184 B2
(45) Date of Patent: Aug. 26, 2014

(54) METHOD AND SYSTEM FOR PLAYING MULTIMEDIA FILE AND COMPUTER READABLE MEDIUM USING THE METHOD

(75) Inventors: Kuan-Chieh Huang, New Taipei (TW); Yuan-Peng Wang, New Taipei (TW); Yi-Wen Liu, New Taipei (TW)

(73) Assignee: Acer Incorporated, New Taipei (TW)

( * ) Notice: Subject to any disclaimer, the term of this patent is extended or adjusted under 35 U.S.C. 154(b) by 129 days.

(21) Appl. No.: 13/087,385

(22) Filed: Apr. 15, 2011

(65) Prior Publication Data

US 2012/0110130 A1    May 3, 2012

(30) Foreign Application Priority Data

Nov. 3, 2010  (TW) .............................. 99137804 A

(51) Int. Cl.
*G06F 15/16* (2006.01)
(52) U.S. Cl.
USPC ............................ 709/219; 709/203; 709/224
(58) Field of Classification Search
USPC ........................................ 709/219, 203, 224
See application file for complete search history.

(56) References Cited

U.S. PATENT DOCUMENTS

| | | | |
|---|---|---|---|
| 7,024,256 B2 * | 4/2006 | Krzyzanowski et al. | 700/65 |
| 2004/0237105 A1 * | 11/2004 | Ha | 725/44 |
| 2005/0240297 A1 * | 10/2005 | Scotzin et al. | 700/94 |
| 2007/0058559 A1 * | 3/2007 | Xu | 370/252 |
| 2008/0104267 A1 * | 5/2008 | Dawson | 709/231 |
| 2008/0205507 A1 * | 8/2008 | Komiya et al. | 375/240.01 |
| 2008/0211805 A1 * | 9/2008 | Blythe et al. | 345/419 |
| 2009/0150570 A1 * | 6/2009 | Tao et al. | 709/249 |
| 2010/0146186 A1 * | 6/2010 | Traister et al. | 711/103 |
| 2010/0169514 A1 * | 7/2010 | Noguchi et al. | 710/19 |
| 2011/0093891 A1 * | 4/2011 | Nakamura | 725/38 |
| 2011/0123167 A1 * | 5/2011 | Li et al. | 386/224 |
| 2012/0221662 A1 * | 8/2012 | Yasukawa et al. | 709/206 |

FOREIGN PATENT DOCUMENTS

| | | |
|---|---|---|
| CN | 101043649 | 9/2007 |
| CN | 101184208 | 5/2008 |
| CN | 101193267 | 6/2008 |
| CN | 101212663 | 7/2008 |

* cited by examiner

*Primary Examiner* — Duyen Doan
(74) *Attorney, Agent, or Firm* — Jianq Chyun IP Office

(57) ABSTRACT

A method and a system for playing a multimedia file and a computer readable medium using the method are provided. In the present invention, a control apparatus sends a control command to a destination apparatus. A multimedia playing module in the destination apparatus is enabled according to the control command. And a response message is sent to the control apparatus by the destination apparatus after receiving the controlling command. Afterwards, the control apparatus transmits the multimedia file to the destination apparatus in a streaming mode for playing the multimedia file through the multimedia playing module.

4 Claims, 4 Drawing Sheets

METHOD AND SYSTEM FOR PLAYING MULTIMEDIA FILE AND COMPUTER READABLE MEDIUM USING THE METHOD

CROSS-REFERENCE TO RELATED APPLICATION

This application claims the priority benefit of Taiwan application serial no. 99137804, filed Nov. 3, 2010. The entirety of the above-mentioned patent application is hereby incorporated by reference herein and made a part of this specification.

BACKGROUND

1. Field of the Invention

The invention relates to a home network structure. Particularly, the invention relates to a method and a system for playing a multimedia file.

2. Description of Related Art

A digital living network alliance (DLNA) is an alliance organization formed by consumer electronics manufactures, mobile phone manufactures and computer manufactures, which develops a unified transmission specification to allow communications among products of different manufactures. Therefore, video/audio devices complied with the DLNA protocol can be directly connected, synchronized and even transmit data to each other.

In a home network, computers, mobile phones, servers and players, etc. complied with the DLNA protocol can all share and play multimedia files (including movies, music and photos, etc.) through the network. Besides a file source, a user may freely select to play the multimedia files on any render capable of playing multimedia files. For example, the user can use a control computer in a kitchen to select a movie in a computer of a working room and play it on a television screen in a living room. In this way, fast and easy audio/video enjoyment of a digital home can be achieved.

However, in a computer system, a multimedia playing module (for example, the windows media player 12 developed by Microsoft) has to be first enabled, so as to receive a play request from a digital media center (DMC). Namely, the multimedia playing module has to be in an enabling state so as to receive the play request from the DMC. Therefore, the freedom of random play is lost, and the user has to approach to the device which is about to execute the play request to perform setting, which is inconvenient in utilization.

SUMMARY OF THE INVENTION

The invention is directed to a method and a system for playing a multimedia file, which can optimize visual enjoyment of remote play and improve usage convenience.

The invention provides a method for playing a multimedia file. According to the method, a control apparatus sends a control command to a destination apparatus. A multimedia playing module of the destination apparatus is enabled according to the control command. The destination apparatus sends a response message to the control apparatus after the multimedia playing module is enabled. Afterwards, the control apparatus transmits the multimedia file to the destination apparatus in a streaming mode, so as to play the multimedia file through the multimedia playing module.

In an embodiment of the invention, before the step of enabling the multimedia playing module of the destination apparatus, an inquiry interface is first enabled to inquire a user whether or not to enable the multimedia playing module.

In an embodiment of the invention, after the step of enabling the multimedia playing module of the destination apparatus, a playing frame of the multimedia playing module is adjusted. For example, the playing frame of the multimedia playing module is adjusted or a size of the playing frame is adjusted.

The invention provide a system for playing a multimedia file including a control apparatus and a destination apparatus. The control apparatus includes a control center module and a first agent transceiver module. The first agent transceiver module is used for sending a control command to the destination apparatus. The destination apparatus includes a multimedia playing module and a second agent transceiver module. The multimedia playing module is used for playing a multimedia file in the control apparatus. The second agent transceiver module is used for receiving the control command and enabling the multimedia playing module, and sending a response message to the first agent transceiver module after enabling the multimedia playing module. After the first agent transceiver module receives the response message, the control center module transmits the multimedia file to the destination apparatus in a streaming mode, so as to play the multimedia file through the multimedia playing module.

In an embodiment of the invention, the second agent transceiver module is further configured to enable an inquiry interface for inquiring a user whether or not to enable the multimedia playing module. Moreover, the second agent transceiver module is further configured to adjust a playing frame of the multimedia playing module after enabling the multimedia playing module.

In an embodiment of the invention, the control apparatus and the destination apparatus are communicated through Internet.

The invention provides a computer readable medium comprising a computer program. The computer program is loaded to a machine to execute a method for playing a multimedia file. The machine has at least one service. The computer program includes a first program code for sending a control command of a control apparatus to a destination apparatus, a second program code for enabling a multimedia playing module of the destination apparatus according to the control command, and a third program code for sending a response message to the control apparatus after the multimedia playing module of the destination apparatus is enabled. Here, the control apparatus transmits the multimedia file to the destination apparatus in a streaming mode, so as to play the multimedia file through the multimedia playing module.

According to the above descriptions, in the invention, the agent transceiver module is set in each of the control apparatus and the destination apparatus, so as to resolve the problem of the related art that the multimedia playing module cannot be enabled through the control apparatus. Moreover, an inquiry mechanism of remote play is added. In this way, a seamless digital streaming technology simultaneously considering privacy and freedom is implemented on a computer platform.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Generally, in a digital home network, computers, mobile phones, servers and players, etc. complying with a digital living network alliance (DLNA) protocol can all share multimedia files (for example movies, music and photos, etc.) through the network. However, in a computer system, a multimedia playing module has to be first enabled to receive a play request from a remote end, so that freedom of random play is lost, which is inconvenient in utilization. Therefore, the invention provides a method and a system for playing the multimedia files, which can facilitate usage of the home network. In order to make the content of the invention comprehensible, several embodiments are described in detail below.

Figure 1:
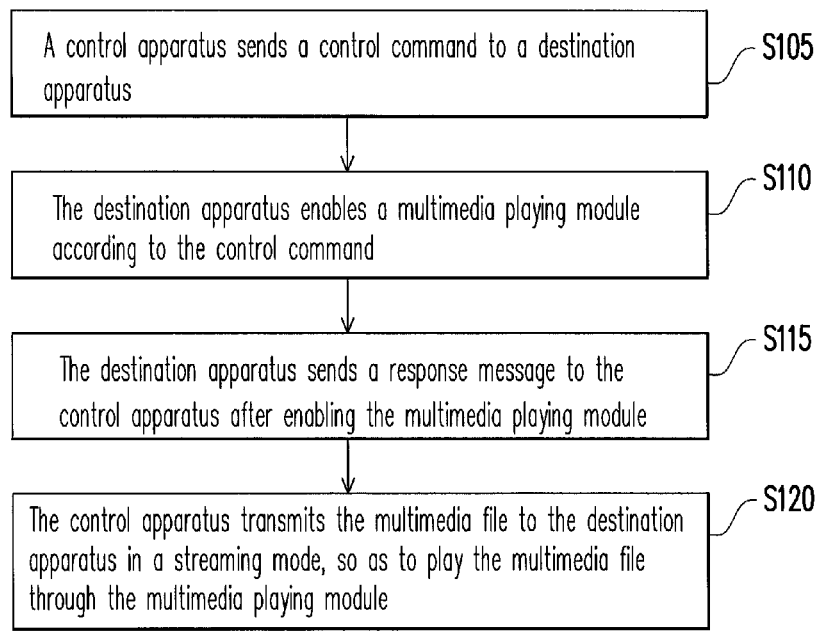
FIG. 1 is a flowchart illustrating a method for playing a multimedia file according to an embodiment of the invention.

FIG. 1 is a flowchart illustrating a method for playing a multimedia file according to an embodiment of the invention. Referring to FIG. 1, in step S105, a control apparatus sends a control command to a destination apparatus. The destination apparatus is, for example, any machine capable of playing multimedia files.

After the destination apparatus receives the control command, in step S110, the destination apparatus enables a multimedia playing module therein (for example, the windows media player 12 developed by Microsoft) according to the control command, i.e. activates the multimedia playing module.

Then, after the destination apparatus enables the multimedia playing module, in step S115, the destination apparatus sends a response message to the control apparatus to notify the control apparatus that the multimedia playing module is ready.

Afterwards, in step S120, the control apparatus transmits the multimedia file to be shared to the destination apparatus in a streaming mode, so as to play the multimedia file through the multimedia playing module. The streaming technique is a technique for playing the multimedia file through the network, i.e. after the multimedia file is compressed, it is transmitted to a buffer of a receiving computer through the streaming mode, and playing of the streaming is controlled through timestamps. In this way, the receiving computer can decompress and play the multimedia file through the multimedia playing module before it is completed received.

In an actual application, an agent transceiver module used for optimizing a remote playing flow is implemented in each of the control apparatus and the destination apparatus for executing on the destination apparatus in a continuous operation mode in the background, which automatically helps a user implementing more settings in collaboration with a customized network protocol besides the original digital home protocol.

Figure 2:
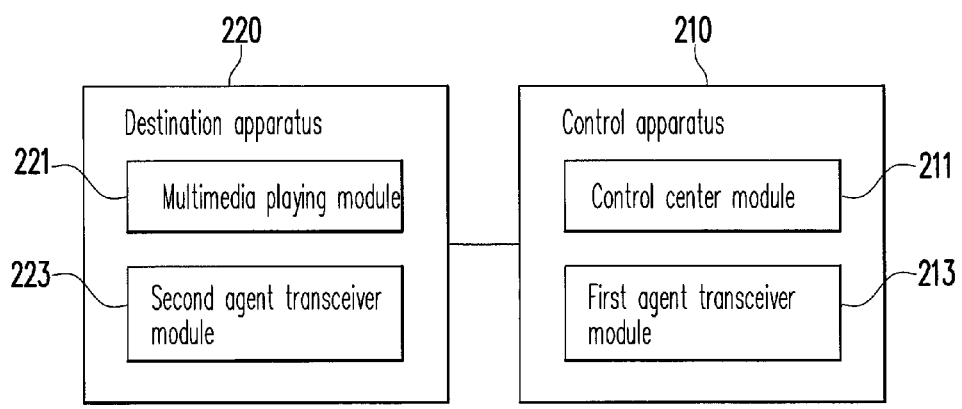
FIG. 2 is a block diagram of a system for playing a multimedia file according to an embodiment of the invention.

Another embodiment is provided below for description. FIG. 2 is a block diagram of a system for playing a multimedia file according to an embodiment of the invention. Referring to FIG. 2, the system 200 for playing the multimedia file includes a control apparatus 210 and a destination apparatus 220. In the present embodiment, for simplicity's sake, the control apparatus 210 only controls one destination apparatus 220. However, in other embodiments, the control apparatus 210 may control two or more than two destination apparatus. Here, the control apparatus 210 and the destination apparatus 220 are, for example, communicated through Internet.

The control apparatus 210 includes a control center module 211 and a first agent transceiver module 213. The destination apparatus 220 includes a multimedia playing module 221 and a second agent transceiver module 223. The first agent transceiver module 213 and the second agent transceiver module 223 are communicated through a customized network protocol. The first agent transceiver module 213 sends a control command to the second agent transceiver module 223. The second agent transceiver module 223 receives the control command and enables the multimedia playing module 221, and sends a response message to the first agent transceiver module 213 after enabling the multimedia playing module 221.

In the control apparatus 210, the control center module 211 is, for example, a digital media center, which is used for selecting a multimedia file to be shared according to an operation of the user. The control center module 211 is further used to select the destination apparatus for sharing. Moreover, after the first agent transceiver module 213 receives the response message, the control center module 211 transmits the multimedia file to the destination apparatus 220 in a streaming mode, so as to play the multimedia file through the multimedia playing module 221.

Figure 3:
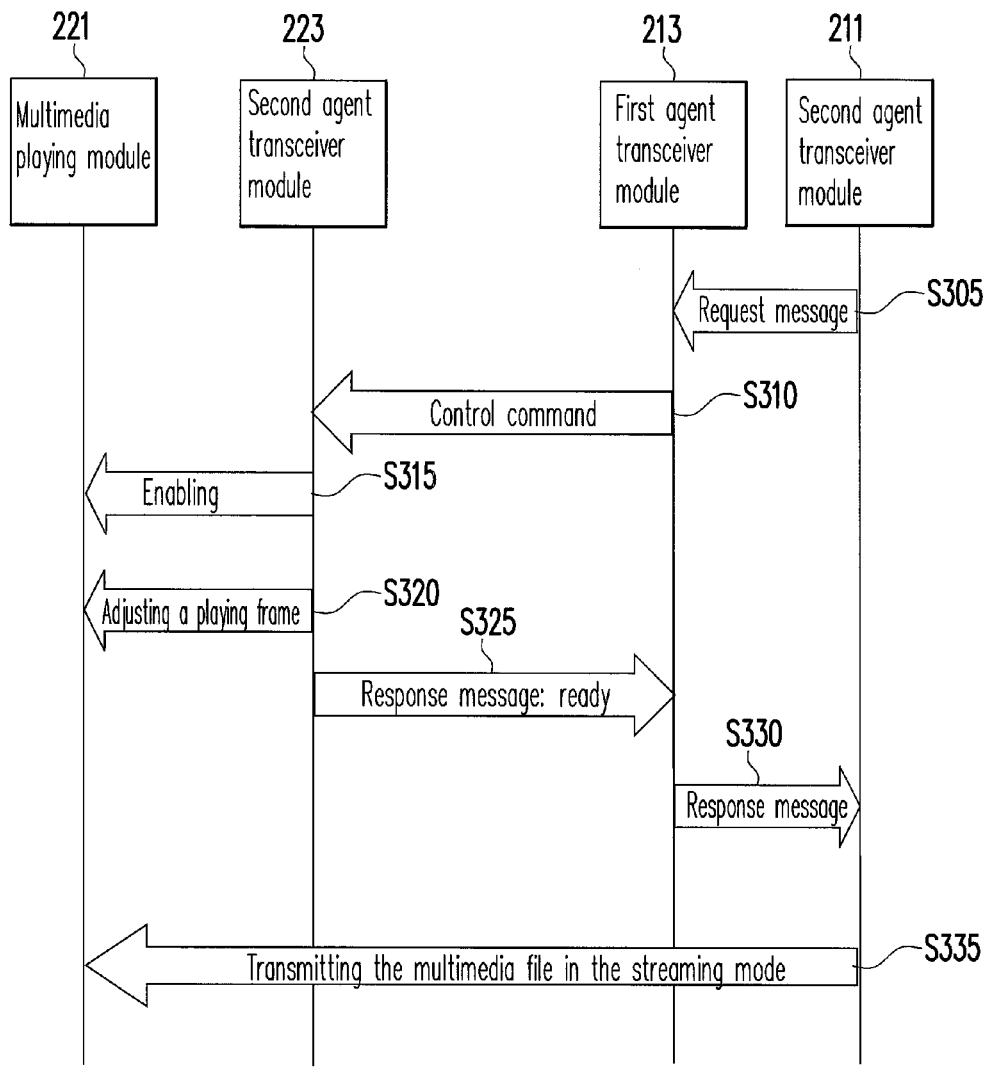
FIG. 3 is a schematic diagram illustrating a multimedia file playing flow according to an embodiment of the invention.

Another embodiment is provided to describe the remote playing flow. FIG. 3 is a schematic diagram illustrating a multimedia file playing flow according to an embodiment of the invention. Referring to FIG. 2 and FIG. 3, when the user wants to share the multimedia file in the control apparatus 210 with the destination apparatus 220, the control center module 211 first sends a request message to the first agent transceiver module 213, as that shown by a step S305.

After the first agent transceiver module 213 receives the request message, in step S310, the first agent transceiver module 213 sends the control command to the second agent transceiver module 223. Then, in step S315, the second agent transceiver module 223 enables the multimedia playing module 221. Then, in step S320, a playing frame is adjusted. For example, a size or a position of the playing frame is adjusted. Namely, the playing frame of the multimedia playing module 221 is adjusted to a full screen or enlarged, and the playing frame is set to the foreground.

Then, in step S325, the second agent transceiver module 223 sends a response message of "ready" to the first agent transceiver module 213. In step S330, the first agent transceiver module 213 sends the response message of "ready" to the control center module 211. In this way, in the control apparatus 210, the control center module 211 obtains the information that the multimedia playing module 221 is ready. Then, in step S335, after receiving the response message of "ready", the control center module 211 transmits the multimedia file in the streaming mode to the multimedia playing module 221 for playing.

Moreover, in an actual application, the operation of "remote play" may violate privacy and freedom of others. Assuming the user is watching a movie played by himself, as long as the other control apparatus sends a play request, the movie enjoyed by the user is interrupted without warning. Therefore, an inquiry mechanism can be added to the destination apparatus, so that the user can select whether or not to accept the remote play request. For example, FIG. 4A and FIG. 4B are schematic diagrams illustrating multimedia file playing flows having an inquiry mechanism according to an embodiment of the invention.

Figure 4A:
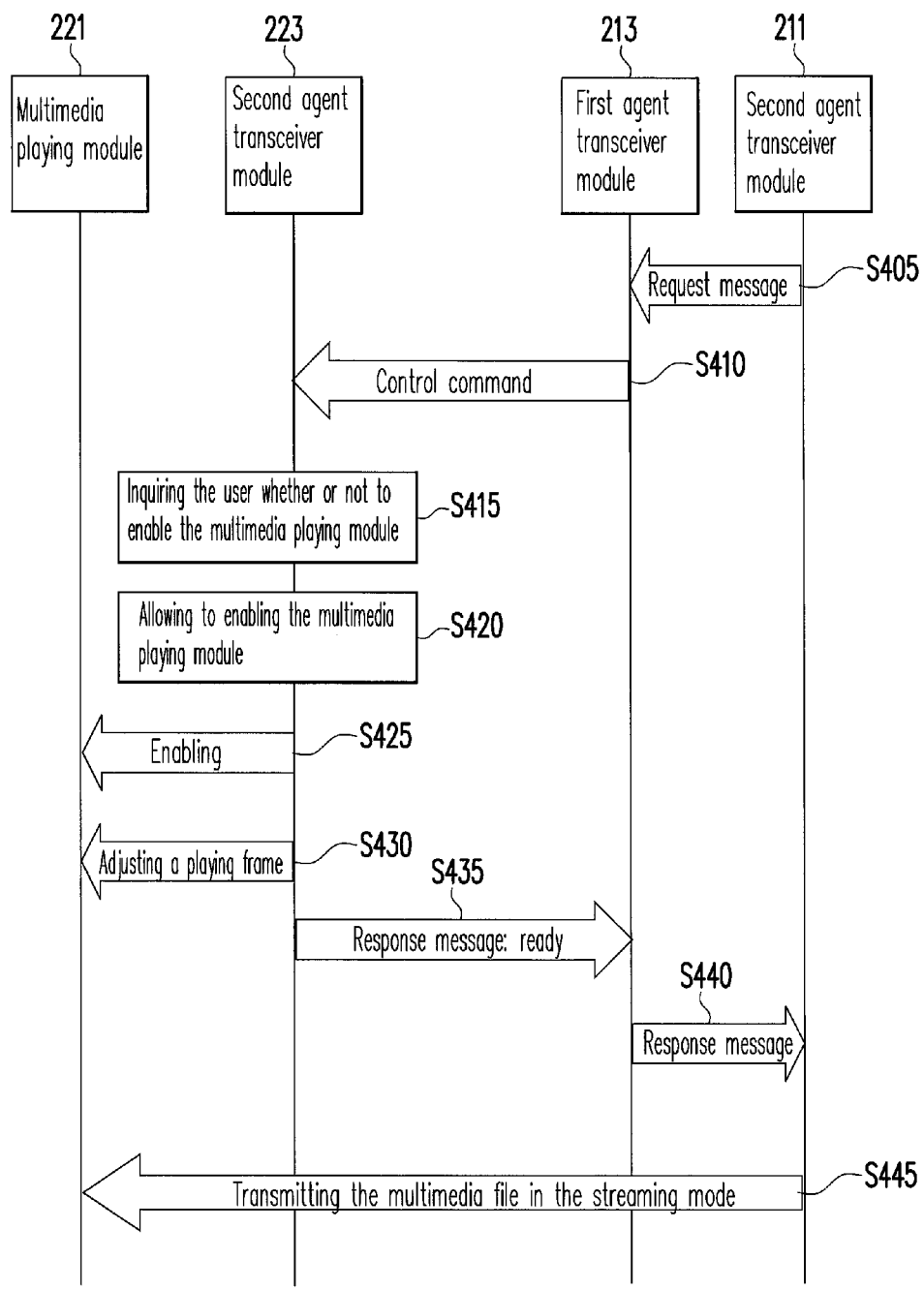
FIG. 4A and FIG. 4B are schematic diagrams illustrating multimedia file playing flows having an inquiry mechanism according to an embodiment of the invention.
Figure 4B:
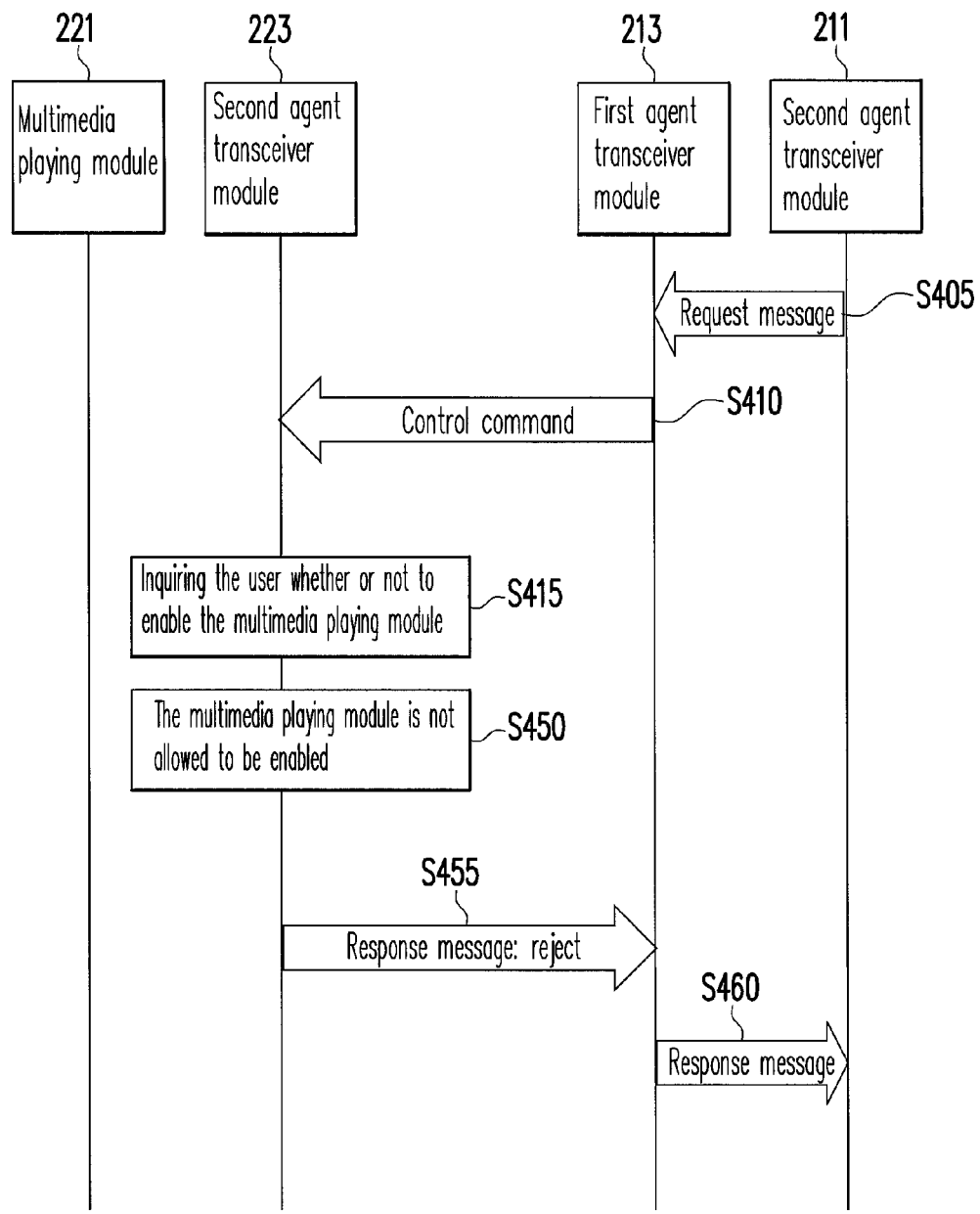

Referring to FIG. 4A and FIG. 4B, in step S405, the control center module 211 sends the request message to the first agent transceiver module 213. Then, in step S410, the first agent transceiver module 213 sends the control command to the second agent transceiver module 223. After the second agent transceiver module 223 receives the control command, it enables an inquiry interface to inquire the user whether or not to enable the multimedia playing module 221, as that shown in step S415. Namely, the inquiry interface is displayed in a screen of the destination apparatus 220, so that the user can select whether or not to receive the control command sent by the control apparatus 210 that is used for requesting the remote play. If the user accepts the request, the following steps are as that shown in FIG. 4A. On the other hand, if the user refuses the request, the following steps are as that shown in FIG. 4B.

In FIG. 4A, if the user accepts the request of "remote play" sent by the control apparatus 210, in step S420, the second agent transceiver module 223 is allowed to enable the multimedia playing module 221, and steps S425-S445 are executed. Here, the steps S425-S445 are respectively the same or similar to the steps S315-S335 of FIG. 3A, so that detailed descriptions thereof are not repeated.

In FIG. 4B, if the user does not accept the control command sent by the control apparatus 210 that is used for requesting the remote play, in step S450, the second agent transceiver module 223 is not allowed to enable the multimedia playing module 221. Then, a step S455 is executed, by which the second agent transceiver module 223 sends a response message of "reject" to the first agent transceiver module 213. In step S460, the first agent transceiver module 213 reports the response message of "reject" to the control center module 211.

The real-time inquiry appeared after the destination apparatus 220 receives the control command can also provide the user a "play state configuration setting". For example, the user may set to refuse all of the control commands used for requesting the remote play when the multimedia playing module 221 is in a playing state, or accept all of the control commands used for requesting the remote play when the multimedia playing module 221 is in an idle state, or the inquiry interface is popped up regardless of any state, etc., which can be adjusted by the user, so as to avoid keeping being disturbed by the inquiry interface.

The invention further provides a computer readable medium, comprising a computer program. The computer program includes program codes adapted to be loaded to a machine to execute the aforementioned method for playing the multimedia file. The machine has at least one service. The computer program includes a plurality of program codes, and after the program codes are loaded to the machine, the aforementioned method for playing the multimedia file is executed and the function of the system for playing the multimedia file is implemented. The program codes at least include a first program code, a second program code and a third program code. The first program code is used for sending the control command of the control apparatus to the destination apparatus. The second program code is used for enabling the multimedia playing module of the destination apparatus according to the control command. The third program code is used for sending the response message to the control apparatus after the multimedia playing module of the destination apparatus is enabled. The control apparatus transmits the multimedia file to the destination apparatus in the streaming mode, so as to play the multimedia file through the multimedia playing module.

In summary, in the invention, a remote play optimizing mechanism of the digital home is provided based on pursuit of perfect experience of the digital home, by which the agent transceiver module is set in each of the control apparatus and the destination apparatus, so as to resolve the problem of the related art that the multimedia playing module cannot be enabled through the control apparatus. Moreover, the playing frame of the multimedia playing module can be automatically adjusted without approaching to the destination apparatus for manual adjustment. In addition, the inquiry mechanism is added, so that the user of the destination apparatus can select to whether or not accept the remote play request, so as to reduce a possibility of malicious disturbing or privacy violation, or the user can set whether or not to accept the remote play request according to the playing state of the multimedia playing module. In this way, a seamless digital streaming technology simultaneously considering privacy and freedom is implemented on a computer platform.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for a control apparatus to play a multimedia file of the control apparatus remotely at a destination apparatus, and the method comprising:
   sending a control command, from a control apparatus, to a destination apparatus;
   displaying an inquiry interface on a screen of the destination apparatus to inquire the destination apparatus whether or not to receive the control command;
   receiving the control command by the destination apparatus according to a selection operation through the inquiry interface;
   activating a multimedia playing module of the destination apparatus to an on state according to the control command;
   adjusting a size and a position of a playing frame of the multimedia playing module and setting the playing frame to the foreground;
   sending a response message, from the destination apparatus, to the control apparatus when the multimedia playing module is activated; and
   transmitting the multimedia file, from the control apparatus, to the destination apparatus in a streaming mode, so as to play the multimedia file through the playing frame of the multimedia playing module.

2. The method as claimed in claim 1, wherein the control apparatus and the destination apparatus are communicated through Internet.

3. A system for playing a multimedia file, comprising:
   a control apparatus, comprising:
   a control center module; and
   a first agent transceiver module, for sending a control command; and
   a destination apparatus, comprising:
   a multimedia playing module, for playing a multimedia file of the control apparatus; and
   a second agent transceiver module, for displaying an inquiry interface on a screen of the destination apparatus for inquiring the destination apparatus whether or not to receive the control command, receiving the control command according to a selection operation through the inquiry interface, activating the multimedia playing module to an on state according to the control command, adjusting a size and a position of a playing frame of the multimedia playing module and setting the playing frame to the foreground, and sending a response message to the first agent transceiver module when the multimedia playing module is activated;

wherein when the first agent transceiver module receives the response message, the control center module is further configured to transmit the multimedia file to the destination apparatus in a streaming mode, so as to play the multimedia file through the playing frame of the multimedia playing module.

4. A non-transitory computer readable medium, comprising a computer program, wherein the computer program is loaded to a machine to execute a method for playing a multimedia file, wherein the machine has at least one service, and the computer program comprising:

a first program code, for sending a control command of a control apparatus to a destination apparatus;

a second program code, for displaying an inquiry interface on a screen of the destination apparatus to inquire the destination apparatus whether or not to receive the control command, receiving the control command by the destination apparatus according to a selection operation through the inquiry interface, activating a multimedia playing module of the destination apparatus to an on state according to the control command, and adjusting a size and a position of a playing frame of the multimedia playing module and setting the playing frame to the foreground; and a third program code, for sending a response message to the control apparatus when the multimedia playing module of the destination apparatus is activated, wherein the control apparatus transmits the multimedia file to the destination apparatus in a streaming mode, so as to play the multimedia file through the playing frame of the multimedia playing module.

\* \* \* \* \*